United States Patent Office 3,245,797
Patented Apr. 12, 1966

---

3,245,797
ANIMAL FEED CONTAINING SPECTINOMYCIN
Malcolm E. Bergy and Clarence De Boer, Kalamazoo, Mich., assignors to The Upjohn Company, Kalamazoo, Mich., a corporation of Delaware
No Drawing. Filed Dec. 13, 1963, Ser. No. 330,226
5 Claims. (Cl. 99—2)

This application is a continuation-in-part of co-pending application Serial No. 847,091 filed October 19, 1959, and co-pending application Serial No. 847,092 filed October 20, 1959.

This invention relates to compositions and methods for animal husbandry and more particularly to animal feed compositions containing spectinomycin and a method for obtaining increased productivity in meat-producing animals.

It has now been discovered that in meat-source animals such as cattle, lambs, swine, poultry and the like, an increased rate of growth and/or an enhanced utilization of feedstuff can be produced according to the process of the present invention which comprises feeding spectinomycin in combination with the feed or drinking water to healthy animals. Advantageously, further increases and enhancement can be obtained by adding, in addition to spectinomycin, other antibiotics, to the animals' feed or drinking water.

As used in the specification and claims the term spectinomycin shall be taken to mean spectinomycin free base and the pharmacologically acceptable acid addition salts thereof.

Spectinomycin is a non-proprietary name adopted by the American Medical Association United States Pharmacopeia Nomenclature Committee of J.A.M.A., vol. 182, No. 7, p. 733 (November 17, 1962). The antibiotic is also referred to in the literature as actinospectacin.

Spectinomycin and the salts thereof can be prepared as described in South African Patent No. 60/4098; Belgian Patent No. 596,175; and U.S. application No. 847,092, filed October 20, 1959, wherein said references, spectinomycin is called actinospectacin.

Unless otherwise specified, all percentages and other ratios are given on a weight to weight basis. The pound (lb.) and ton weights given are avoirdupois units.

The compositions of the present invention are prepared by simply mixing the spectinomycin into the animals' regular feed.

Advantageously the spectinomycin is supplied in the form of a premix wherein the concentration is 1000 to 2000 times greater than the desired concentration in the feed whereby it is possible to add 1 to 2 lb. of premix to a ton of feed.

The concentration of spectinomycin in the feed composition is determined with regard to the species of animal, age, weight, and average amount of feed consumed daily. The following table illustrates the range of spectinomycin in grams per ton of feed for representative animals.

| Animal | Range (gram/ton) | Preferred amount (gram/ton) |
|---|---|---|
| Swine (birth to 8 weeks) | 15–200 | 100 |
| Swine (40–100 lb.) | 10–200 | 50 |
| Chicken (0–12 weeks) | 2–100 | 10 |
| Turkeys (0–24 weeks) | 2–100 | 10 |
| Beef cattle (fattening) | 2–100 | 8 |
| Calves (0–12 weeks) | 10–200 | 50 |
| Lambs | 5–100 | 25 |

An additional embodiment of the process of the present invention is the administration of spectinomycin dispersed in the animals' drinking water as an alternative to the administration of spectinomycin in combination with the animals' feed.

For administration with drinking water, a premix is conveniently prepared comprising spectinomycin in combination with a solid, non-toxic, water-soluble diluent.

The concentration of spectinomycin in water is about ½ the concentration (weight to weight basis) of the spectinomycin concentration in feed, or more conveniently expressed in grams/gallon. For example, in each 250 gallons of drinking water (about 1 ton) would be dissolved the following amounts of spectinomycin: 7.5 to 100 grams for swine (to 8 weeks); 5 to 100 grams for swine (40–100 lb.) and calves; 1 to 50 grams for chickens, turkeys and cattle; and 2.5 to 50 grams for lambs.

The composition of the present invention, in form suitable for poultry feed, can be fed to chickens and other fowl as a therapetuic and prophylactic treatment for infections due to *Salmonella pullorum*.

An additional aspect of the present invention in the feeding of spectinomycin in combination with another antibiotic, e.g., neomycin, penicillin, novobiocin and erythromycin to obtain an advantageous combination of properties and synergistic growth responses.

The antibiotics combinations are added to the animals' nutritionally adequate feedstuff in a total amount of from 5 to 100 mg. per pound of feed. The antibiotics are present in a ratio of from 1 part to 4 parts of spectinomycin to 1 part of a member selected from the group consisting of neomycin, penicillin, novobiocin, and erythromycin.

As used in the specification and claims the term "neomycin" is used in reference to the antibiotic more fully described in Waksman, Neomycin, Rutgers University Press, 1953. The term includes the various forms, for example the B and C forms and their active salts, for example, the water soluble sulfate and hydrochloride as well as the organic solvent soluble salts, for example the laurate, myristate, oleate, palmitate, stearate and mixed salts of like fatty acids.

The term "penicillin" as used herein is intended to include the various forms thereof, such as penicillin G, penicillin O, and pencillin V, as well as the various insoluble salts thereof, including the amine salts, such as the procaine salt, the N,N-dibenzylethylenediamine salt, and the like.

As used in the specification and claims, the term "novobiocin" shall be construed as including the free acid and the pharmaceutically and physiologically acceptable salts of novobiocin and dihydronovobiocin, in particular the acid and neutral salts including the alkali metal and alkaline earth salts, such as the sodium, potassium, calcium and magnesium salts; the amine salts, such as the procaine salts and the various complexes of novobiocin and dihydronovobiocin.

The term "erythromycin" is used in the present specification and claims in the generic sense and denotes erythromycin itself, which is characterized as a nitrogenous base, erythromycin B, and the acid addition salts and esters thereof. It is more fully described in U.S. Patent 2,653,899 issued September 29, 1953, and Pettinger et al., J.A.C.S. 76: 569–571 (1954).

The following examples illustrate the best mode contemplated by the inventor for carrying out the invention but are not to be construed as limiting the scope thereof.

EXAMPLE 1

A swine diet for growing hogs of 40 to 100 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bone meal | 0.5 |
| Salt | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin $B_{12}$ supplement [4] | 0.08 |

[1] Contains the following percent of minerals: Mn, 12; Co, 0.08; Fe, 5.0; Cu, 0.4; I, 0.24; Zn, 0.7.
[2] Contains 300 USP units $D_3$/gm, and 1500 I.U. A/gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per lb.

To 999 parts of the preceding feed is added 1 part of a premix composition prepared by mixing 25 gm. of spectinomycin free base with sufficient ground limestone to make one pound.

The feeding composition so prepared supplies 25 mg. of spectinomycin per pound, or about 55 parts per million.

The foregoing composition is usefully fed to hogs for increased rate of weight gain and improved utilization of feed.

EXAMPLE 2

A fattening feed for 800 pound yearling cattle is prepared from the following types and amounts of ingredients:

| | Percent |
|---|---|
| Ground ear corn | 89.75 |
| Soybean oil meal, 44% | 9.0 |
| Ground limestone | 0.7 |
| Salt | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 999 parts of the preceding feed is added 1 part of a premix composition prepared by mixing 4 gm. of spectinomycin free base with sufficient wheat flour to make 1 pound.

The feeding composition so prepared supplied 4 mg. of spectinomycin per pound, or about 8.8 parts per million.

Cattle are to receive the foregoing feed ad libitum together with 5 lb. of hay per head per day and when so fed have an increased rate of weight gain and improved utilization of feed.

EXAMPLE 3

A chicken feed for broilers is prepared from the following types and amounts of ingredients:

| | Percent |
|---|---|
| Yellow corn meal | 67.35 |
| Soybean oil meal | 24.00 |
| Menhaden fish meal | 6.00 |
| Steamed bone meal | 1.00 |
| Ground limestone | 1.00 |
| Iodized salt | .34 |
| 25% choline chloride | .13 |
| Vitamin $B_{12}$ supplement (6 mg./lb.) | .10 |
| Manganese sulfate | .02 |
| Supplemental vitamin mix [1] | .06 |

[1] Consisting of 16.0 gm. vitamin A supplement (10 units/mg.); 3.6 gm. vitamin $D_3$ supplement (15,000 units/gm.); 7.1 gm. riboflavin supplement (1 gm. riboflavin per ounce); 500 mg. niacin.

To 999 parts of the preceding feed is added 1 part of a premix composition prepared by mixing 5 gm. spectinomycin free base with sufficient soybean mill feed to make 1 pound.

The feeding composition is usefully fed to chickens for increased rate of weight gain and improved utilization of feed. Similarly the composition can be fed to turkeys, ducks and geese.

EXAMPLE 4

A diet for fattening lambs is prepared from the following types and amounts of ingredients:

| | Percent |
|---|---|
| Ground ear corn | 82.05 |
| Alfalfa meal | 10.0 |
| Soybean oil meal 44% | 7.0 |
| Ground limestone | 0.3 |
| Salt | 0.6 |
| Trace mineral mixture [1] | 0.05 |

[1] Contains the following percent of minerals: Mn, 12; Co, 0.08; Fe, 5.0; Cu, 0.4; I, 0.24; Zn, 0.7.

The above feed to be mixed, pelleted and offered to fattening lambs free-choice in conjunction with hay.

To 999 parts of the preceding feed is added 1 part of a premix composition prepared by mixing 12.5 gm. of spectinomycin free base with sufficient corn meal to make one pound.

The feeding composition so prepared supplies 12.5 mg. of spectinomycin per pound or 27.5 parts per million.

EXAMPLE 5

A premix for addition to drinking water is prepared from the following types and amounts of ingredients:

| | Grams |
|---|---|
| Spectinomycin hydrochloride | 4 |
| Sucrose | 450 |

The spectinomycin hydrochloride, and sucrose are mixed together.

The premix is added to drinking water in the following amounts: chickens and turkeys ½ lb./250 gallons; and beef cattle 1 lb./250 gallons.

EXAMPLE 6

Premix A

| | Grams |
|---|---|
| Spectinomycin | 0.4 |
| Neomycin sulfate | 0.1 |
| Lactose, q.s. 1 lb. | |

Premix B

| | |
|---|---|
| Spectinomycin hydrochloride | 0.334 |
| Neomycin sulfate | 0.166 |
| Calcium carbonate, q.s. 1 lb. | |

Premix C

| | |
|---|---|
| Spectinomycin hydrochloride | 0.25 |
| Neomycin sulfate | 0.25 |
| Corn meal, q.s. 1 lb. | |

Premix D

| | |
|---|---|
| Spectinomycin hydrochloride | 0.4 |
| Neomycin sulfate | 0.1 |
| Cottonseed oil, q.s. 1 lb. | |

Premix E

| | |
|---|---|
| Spectinomycin hydrochloride | 80 |
| Neomycin sulfate | 20 |
| Sucrose, q.s. 1 lb. | |

Premix F

| | Grams |
|---|---|
| Spectinomycin sulfate | 66.6 |
| Neomycin sulfate | 33.4 |
| Oyster shell flour, q.s. 1 lb. | |

Premix G

| | |
|---|---|
| Spectinomycin sulfate | 50 |
| Neomycin sulfate | 50 |
| Wheat flour, q.s. 1 lb. | |

Premix H

| | |
|---|---|
| Spectinomycin sulfate | 80 |
| Neomycin sulfate | 20 |
| Corn oil, q.s. 1 lb. | |

The foregoing premix formulas are prepared using finely ground solid materials and mixing all ingredients together in an appropriate manner.

Following the preceding formulas, premixes are similarly prepared substituting procaine penicillin G novobiocin acid calcium or erythromycin for the neomycin sulfate of the formula.

EXAMPLE 7

A swine growing diet for hogs of 40 to 100 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bonemeal | 0.5 |
| Sodium chloride | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin $B_{12}$ supplement [4] | 0.08 |

[1] Contains the following percent of minerals: Mn, 12; Co, 0.08; Fe, 5.0; Cu, 0.4; I, 0.24; Zn, 0.7.
[2] Contains 300 U.S.P. units $D_3$/gm. and 1500 I.U. A/gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per lb.

To 99 parts of the preceding feed is added 1 part of Premix A to provide a feed with 5 mg. per lb. of antibiotic.

Substituting Premixes B through H, inclusive, feeds are prepared with varying amounts and ratios of antibiotics.

The foregoing composition is usefully fed to hogs for increased rate of weight gain and for improved feed efficiency.

EXAMPLE 8

A fattening feed for 800 pound yearling cattle is prepared from the following types and amounts of ingredients:

| | Percent |
|---|---|
| Ground ear corn | 89.75 |
| Soybean oil meal, 44% | 9.0 |
| Ground limestone | 0.7 |
| Sodium chloride | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 99 parts of the preceding feed is added 1 part of Premix A to provide a feed with 5 mg. per lb. of antibiotic.

Substituting Premixes B through H, inclusive, feeds are prepared with varying amounts and ratios of antibiotics.

Cattle are to receive the foregoing feed ad libitum together with 5 lb. of hay per head per day for an increased rate of weight gain and increased feed efficiency.

EXAMPLE 9

A chicken feed for broilers is prepared from the following types and amounts of ingredients:

| | Percent |
|---|---|
| Yellow corn meal | 67.35 |
| Soybean oil meal, 50% | 24.00 |
| Menhaden fish meal, 60% | 6.00 |
| Steamed bone meal | 1.00 |
| Ground limestone | 1.00 |
| Iodized salt | 0.34 |
| 25% choline chloride | 0.13 |
| Vitamin $B_{12}$ supplement (6 mg./lb.) | 0.10 |
| Manganese sulfate | 0.02 |
| Supplemental vitamin mix [1] | 0.06 |

[1] Consisting of 16.0 gm. vitamin A supplement (10,000 units/gm.); 3.6 gm. vitamin $D_3$ supplement (15,000 units/gm.); 7.1 gm. riboflavin supplement (1 gm. riboflavin per ounce); 500 mg. niacin.

To 99 parts of the preceding feed is added 1 part of Premix A to provide a feed with 5 mg. per lb. of antibiotic.

Substituting Premixes B through H, inclusive, feeds are prepared with varying amounts and ratios of antibiotics.

The foregoing composition is usefully fed to chickens for increased rate of weight gain and improved utilization of feed.

What is claimed is:

1. An animal feed composition comprising spectinomycin in combination with an animal feed wherein the spectinomycin is present in a concentration of from an amount effective to promote growth up to 200 gm. per ton of feed.

2. A process for obtaining increased weight gain in healthy meat-producing animals comprising the feeding of spectinomycin in an amount effective to promote growth to a healthy meat-producing animal.

3. A process for obtaining increased weight gain in healthy meat-producing animals comprising the feeding of spectinomycin in an amount effective to promote growth in combination with an animal feed to a healthy meat-producing animal.

4. A process for obtaining increased production in healthy meat-producing animals comprising the feeding of from one to four parts by weight of spectinomycin to one part by weight of a member selected from the group consisting of neomycin, penicillin, novobiocin, and erythromycin, in combination with an animal feed wherein said spectinomycin and member are present in an amount effective to promote growth.

5. An animal feed for increasing production in healthy meat-producing animals comprising from one to four parts by weight of spectinomycin to one part by weight of a member selected from the group consisting of neomycin, penicillin, novobiocin, and erythromycin, in combination with an animal feed wherein said spectinomycin and member are present in an amount effective to promote growth.

References Cited by the Examiner
UNITED STATES PATENTS 2,903,356  9/1959  Lampen et al. _____ 99—2

A. LOUIS MONACELL, *Primary Examiner.*